US011897173B2

(12) United States Patent
Kestle

(10) Patent No.: US 11,897,173 B2
(45) Date of Patent: Feb. 13, 2024

(54) INJECTION MOLDING APPARATUS WITH LOAD-BALANCING MECHANISM

(71) Applicant: MOLD-MASTERS (2007) LIMITED, Georgetown (CA)

(72) Inventor: Martin Kestle, Everett (CA)

(73) Assignee: Mold-Masters (2007) Limited, Georgetown (CA)

( * ) Notice: Subject to any disclaimer, the term of this patent is extended or adjusted under 35 U.S.C. 154(b) by 235 days.

(21) Appl. No.: 17/317,288

(22) Filed: May 11, 2021

(65) Prior Publication Data

US 2022/0362977 A1    Nov. 17, 2022

(51) Int. Cl.
*B29C 45/17* (2006.01)
*B29C 45/07* (2006.01)

(52) U.S. Cl.
CPC .......... *B29C 45/1761* (2013.01); *B29C 45/07* (2013.01)

(58) Field of Classification Search
CPC ............ B29C 45/1781; B29C 45/1777; B29C 45/1761; B29C 45/00
See application file for complete search history.

(56) References Cited

U.S. PATENT DOCUMENTS

| 6,524,095 | B1 | 2/2003 | Ito et al. |
| 7,402,036 | B2 | 7/2008 | Schmidt et al. |
| 2003/0108639 | A1* | 6/2003 | Provencher ............ B29C 45/07 425/574 |
| 2007/0087080 | A1 | 4/2007 | Weinmann |
| 2008/0102156 | A1* | 5/2008 | Wang .................. B29C 45/1761 425/589 |
| 2016/0178003 | A1* | 6/2016 | Lee ..................... F16C 29/0635 264/273 |
| 2018/0001378 | A1* | 1/2018 | Murata .................. B22D 17/26 |
| 2020/0016813 | A1* | 1/2020 | Maki ...................... B29C 45/84 |

FOREIGN PATENT DOCUMENTS

| JP | S6132725 A | 2/1986 | |
| WO | WO-2005023507 A1 * | 3/2005 | ............ B29C 45/07 |

* cited by examiner

*Primary Examiner* — Alison L Hindenlang
*Assistant Examiner* — Debjani Roy
(74) *Attorney, Agent, or Firm* — Dinsmore & Shohl LLP

(57) ABSTRACT

An apparatus for injecting a molten material including an injector, a rail, a bell crank, and a frame supporting the injector via the rail for guiding the linear translation of the injector along the frame. The apparatus includes a first guide and a second guide slideably coupled to the rail, the second guide attached to the injector and spaced from the first guide along the rail, and a bell crank coupled to the first guide and second guide to provide a load-balancing mechanism.

19 Claims, 6 Drawing Sheets

INJECTION MOLDING APPARATUS WITH LOAD-BALANCING MECHANISM

FIELD

The invention relates generally to an injection molding apparatus, and in particular, to an injection molding apparatus with an injector coupled to a load-balancing mechanism.

BACKGROUND

In some injection molding apparatuses, an injector, with a nozzle at an end, is advanced by an actuator towards an inlet of a mold. Once the nozzle is in contact with the inlet of the mold, the actuator urges the nozzle against the mold to prevent the nozzle from separating from the mold as the injector injects molten material into the mold. If the force applied by the actuator is not aligned with the force experienced by the injector, the nozzle of the injector can misalign with the inlet of the mold.

BRIEF SUMMARY

An aspect of the present application provides an apparatus for injecting a molten material comprising: an injector for injecting the molten material; a frame supporting the injector; a rail for guiding the linear translation of the injector along the frame, the rail supported by the frame; a first guide and a second guide slideably coupled to the rail, the second guide attached to the injector and spaced from the first guide along the rail; and a bell crank including a first location, a second location, and a third location arranged in a triangle, the bell crank rotateably coupled to the first guide at the first location, the bell crank rotateably coupled to the second guide at the second location such that applying a linear force at the third location in a first direction from the second guide towards the first guide translates the first and second guides in the first direction along the rail.

The rail can include two lateral opposite sides and the apparatus can further comprise an another bell crank, each of the bell crank and the another bell crank is located on a respective one of the two lateral opposite sides of the rail; the another bell crank including a fourth location, a fifth location, and a sixth location arranged in a triangle, the another bell crank rotateably coupled to the first guide at the fourth location, the another bell crank rotateably coupled to the second guide at the fifth location such that applying a linear force at the sixth location in the first direction translates the first and second guides in the first direction along the rail.

At any location along the rail, the first guide can be substantially restricted from distancing from the rail in a second direction along a line not substantially parallel to the rail.

The rail can include two longitudinal protrusions, one on each respective lateral sides of the rail, the first guide includes a body having two flanges defining a space for partially receiving the rail, each flange adjacent a respective lateral sides of the rail, each flange including a protrusion engaging a respective one of longitudinal protrusions of the rail thereby substantially restricting the first guide from distancing from the rail in the second direction.

The apparatus can comprise a third guide slideably coupled to the rail, upstream of the second guide, supporting and attached to the injector.

The bell crank can be rotateably coupled to the first guide at the first location via a pin joint and the another bell crank can be rotateably coupled to the first guide at the fourth location via a pin joint.

The bell crank can be rotateably coupled to the second guide at the second location via a pin joint and the another bell crank is rotateably coupled to the second guide at the fifth location via a pin joint.

The rail can be a linear slide rail.

The first guide can include a carriage block.

The second guide can be a trunnion including two pins one on each opposing sides of the trunnion extending away from the rail.

The apparatus can comprise a linear actuator rotateably coupled to the bell crank at the third location via a pin joint and rotateably coupled to the another bell crank at the sixth location via pin joint to translate the injector along the rail.

The linear actuator can include a motor.

BRIEF DESCRIPTION OF THE DRAWINGS

The drawings are not to scale.

DETAILED DESCRIPTION

Specific embodiments of the present application are now described with reference to the figures. The following detailed description is merely exemplary in nature and is not intended to limit the concepts and uses of the concepts. Furthermore, there is no intention to be restricted by any expressed or implied theory in the present application. In the description, "downstream" is used with reference to the direction of the molten material flow from an injector to a mold, and also with reference to the order of components, or features thereof, through which the molten material flows from the injector to the mold, whereas "upstream" is used with reference to the opposite direction. Depending on context, upstream and downstream can be used as relative or absolute terms.

Figure 1:
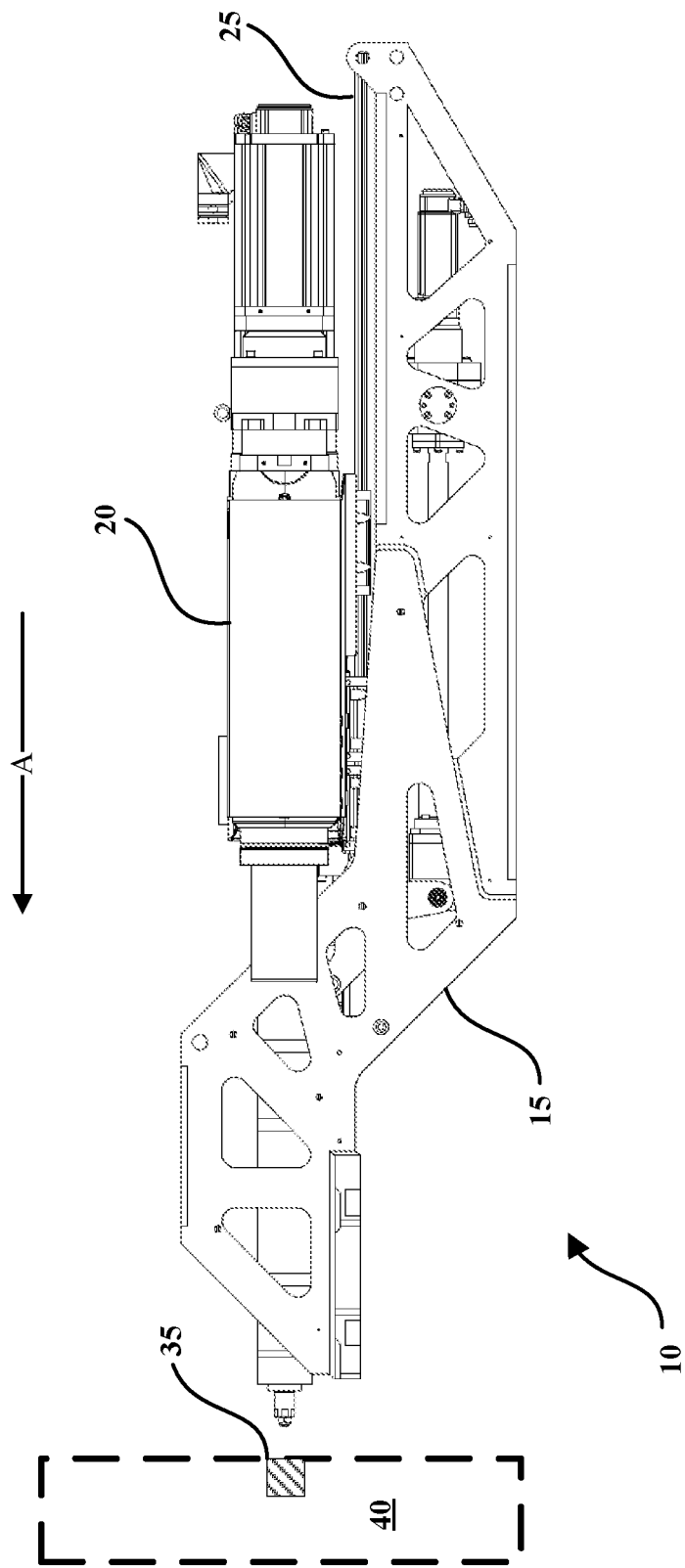
FIG. 1 is a side view of an apparatus for injecting a molten material according to an embodiment of the present application.

Referring to FIG. 1, an apparatus for injecting a molten material (e.g., plastic) is generally indicated by 10. Apparatus 10 comprises a frame 15, an injector 20, a rail 25, and an actuator 30 (see FIG. 2). Rail 25 is supported by frame 15 and injector 20 is supported by rail 25. In other words, injector 20 is supported by frame 15 via rail 25. Actuator 30 is a linear actuator coupled to injector 20 to translate injector 20 relative to frame 15 towards, or away from, an inlet 35 of a mold 40 (both shown schematically in FIG. 1). Injector 20 is for injecting a molten material (not shown) into mold 40 via inlet 35. Rail 25 is for guiding the linear translation of injector 20 along frame 15.

Figure 2:
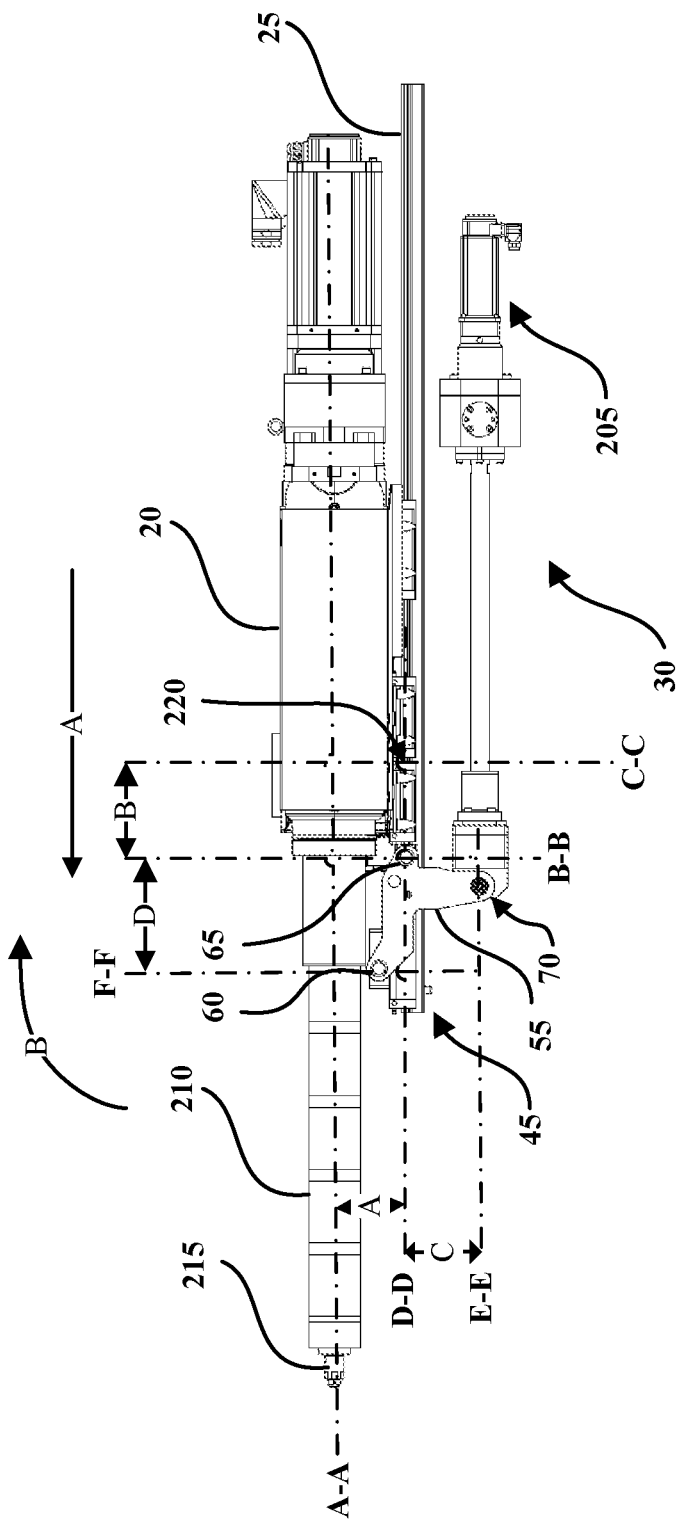
FIG. 2 is a side view of some components of the apparatus of FIG. 1 isolated from the frame.
Figure 3:
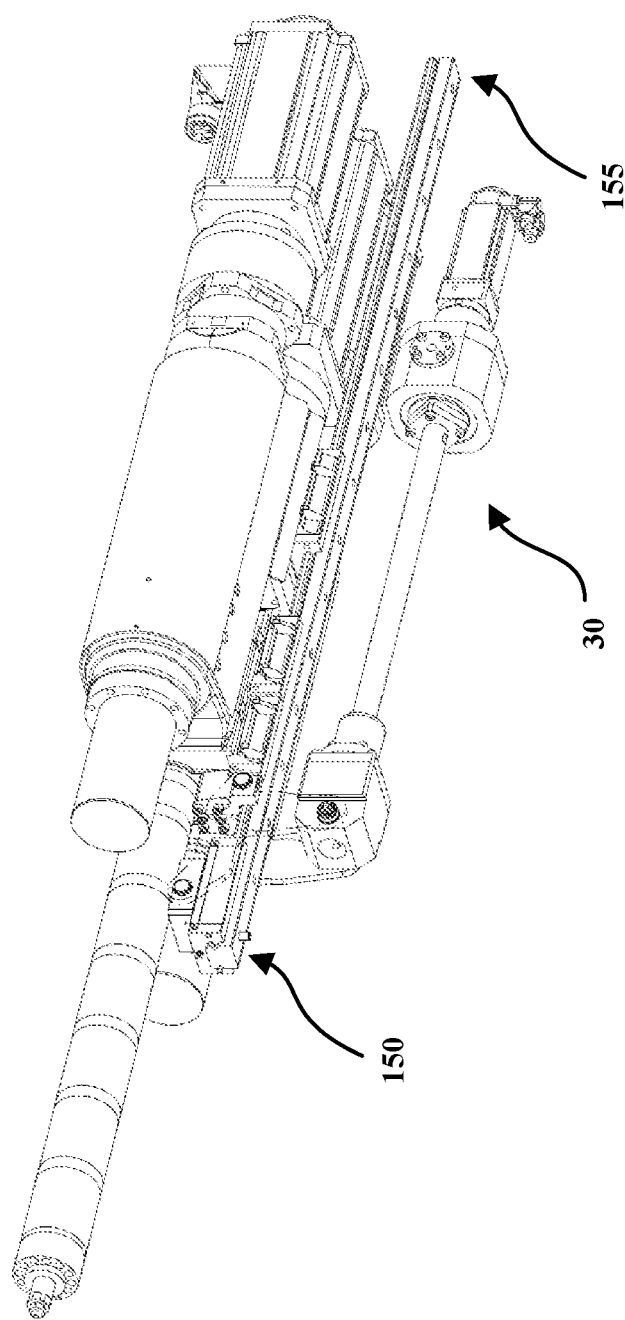
FIG. 3 is a bottom perspective view of some components of the apparatus of FIG. 1 isolated from the frame.
Figure 4:
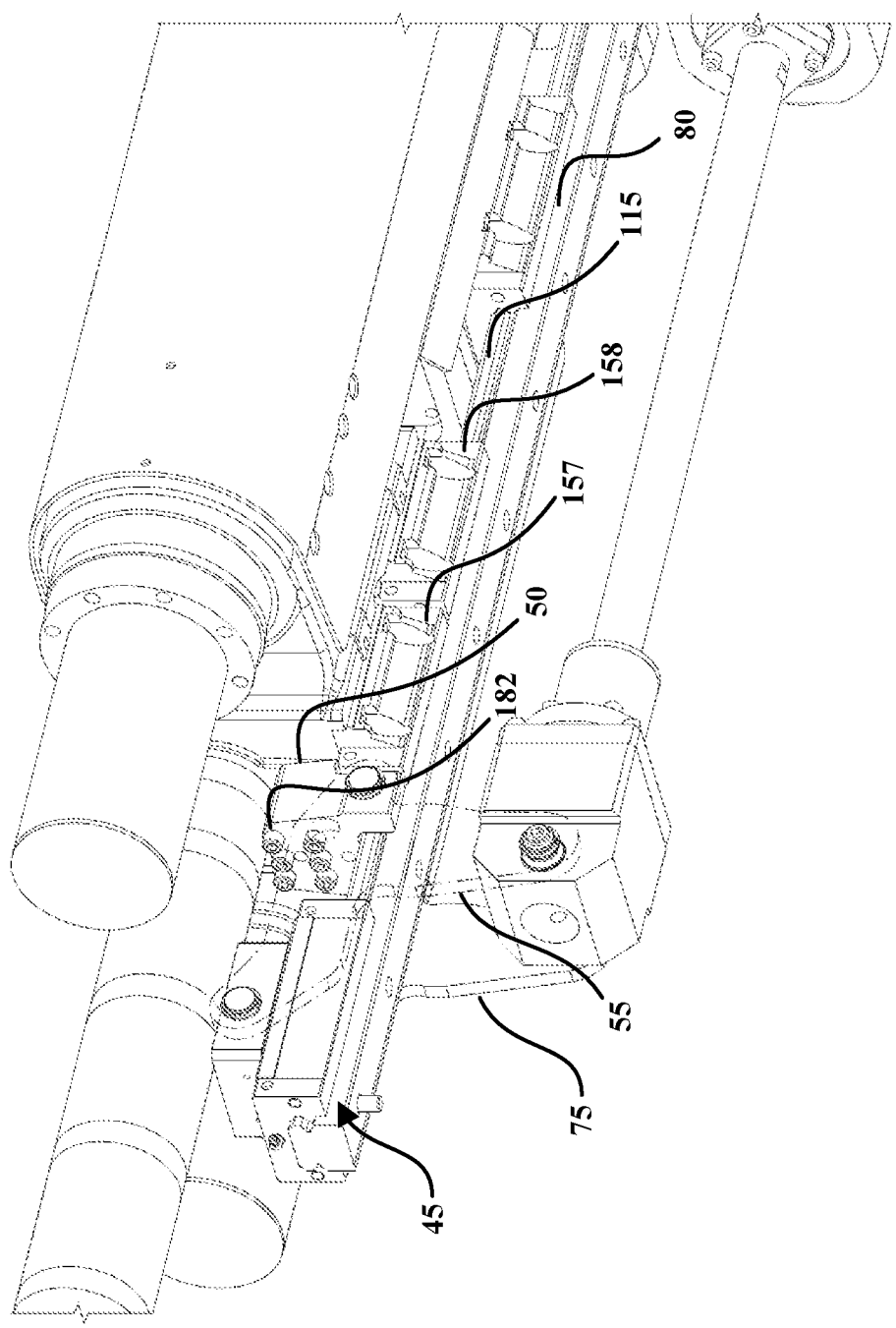
FIG. 4 is a magnified view of a portion of FIG. 3.

Referring to FIG. 2, FIG. 3, and FIG. 4, apparatus 10 comprises a first guide 45 and a second guide 50 slideably coupled to rail 25. Second guide 50 is attached to injector 20, spaced from first guide 45 along rail 25, and upstream of first guide 45. Apparatus 10 comprises a bell crank 55 including a first location 60, a second location 65, and a third location 70 arranged in a triangle (see FIG. 2). (Bell crank 55 is shown in phantom in some figures to show components obscured by bell crank 55.) Bell crank 55 is rotateably coupled to first guide 45 at first location 60 and rotateably coupled to second guide 50 at second location 65 such that applying a linear force at third location 70 in a first direction A from second guide 50 towards first guide 45 (i.e., downstream direction) translates first and second guides 45, 50 in first direction A.

Figure 5:
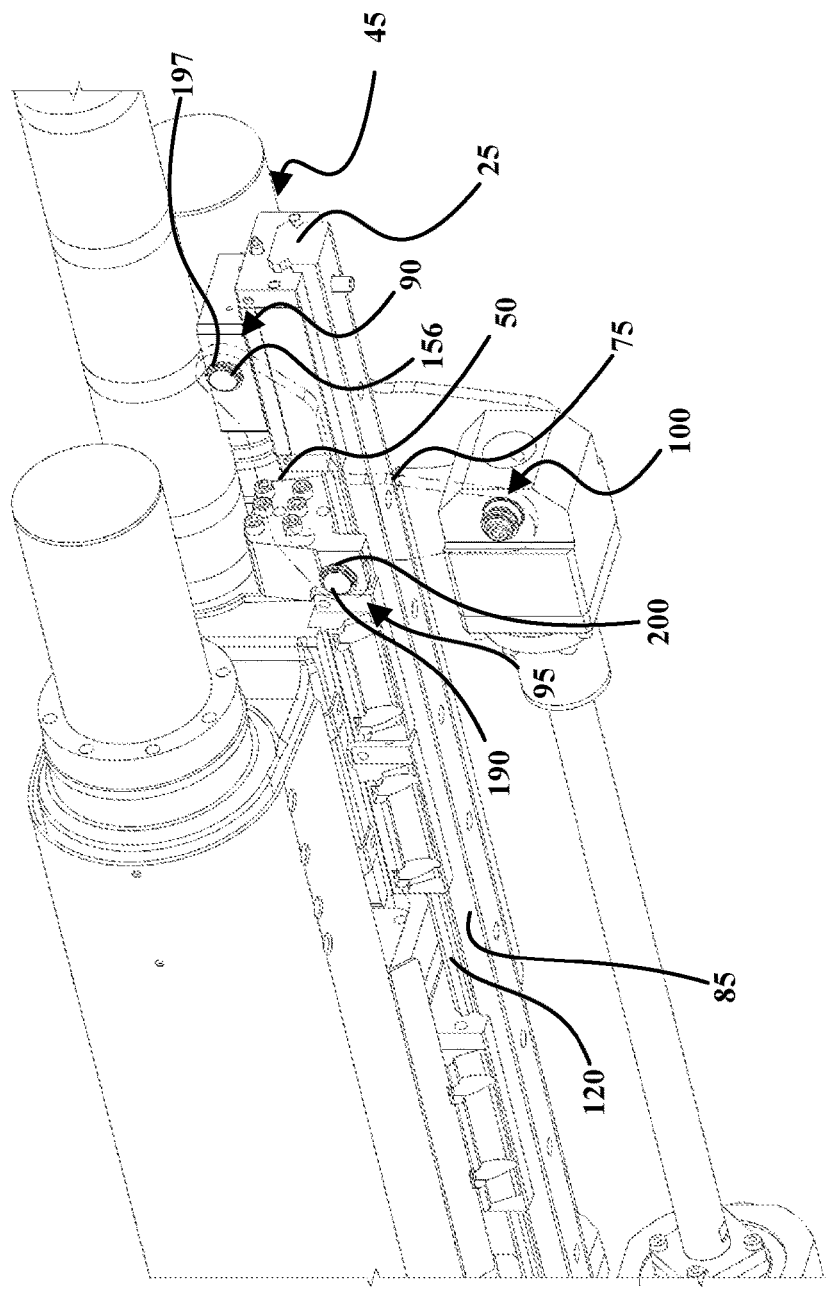
FIG. 5 is a magnified view of a portion of FIG. 3 showing a side opposite of the view shown in FIG. 4.

Referring to FIG. 5, apparatus 10 comprises a bell crank 75 (shown in phantom in FIG. 5 to show components obscured by bell crank 75). Each of bell crank 55 and bell crank 75 is located on a respective one of lateral opposite sides 80, 85 of rail 25. Bell crank 75 includes a fourth location 90, a fifth location 95, and a sixth location 100 arranged in a triangle. Bell crank 75 is rotateably coupled to first guide 45 at fourth location 90 and rotateably coupled to second guide 50 at fifth location 95 such that applying a linear force at sixth location 100 in first direction A translates first and second guides 45, 50 in first direction A.

First guide 45 is substantially restricted from decoupling from rail 25 at any location along rail 25. In the illustrated embodiments, first guide 45 includes a carriage block 105 and a block 110 (see FIG. 6) supported by carriage block 105 and rail 25 is a linear slide rail. Rail 25 includes two longitudinal protrusions 115, 120, on lateral sides 80, 85 of rail 25, respectively. First guide 25 includes a body 125 having two flanges 130, 135 defining a space 140 to partially receive rail 25 (see FIG. 6). Each of flanges 130, 135 is adjacent to one of respective lateral sides 80, 85 of rail 25. Each of flanges 130, 135 includes a protrusion 145 extending into space 140 and engaging a respective one of protrusions 115, 120 coupling first guide 45 to rail 25 thereby allowing first guide 45 to decouple from rail 25 only at any of the two ends 150, 155 of rail 25 (see FIG. 3). That is, in the illustrated embodiments, first guide 45 is directly coupled to rail 25 via the engagement of protrusions 145 with respective protrusions 115, 120. In the illustrated embodiments, first guide 45 includes a protrusion 156 (implemented as a pin) on each of opposite lateral sides of first guide 45 extending towards one of respective bell cranks 55, 75 (see FIG. 5 and FIG. 6). In the illustrated embodiments, protrusions 156 is attached to block 110 but a person of ordinary skills in the relevant art would appreciate that protrusions 156 can be attached to carriage block 105 and block 110 can be omitted.

Figure 6:
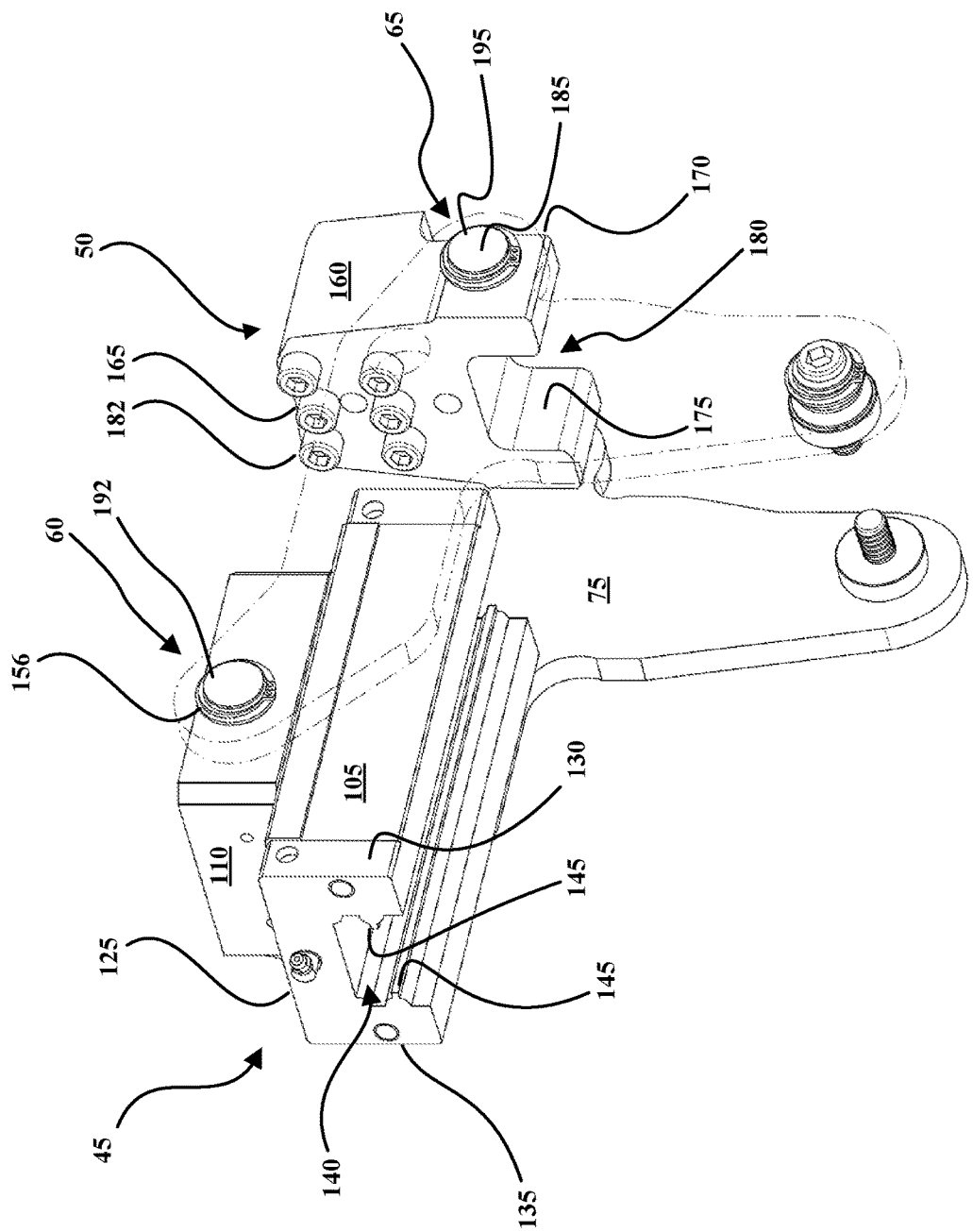
FIG. 6 is a bottom perspective view of some components of the apparatus of FIG. 1 isolated from the frame and other components.

Referring to FIG. 4 and FIG. 6, apparatus 10 comprises guides 157, 158 supporting injector 20 on rail 25. Guide 157 is spaced from and upstream of second guide 50. Guide 158 is upstream of guide 157. In the illustrated embodiments, guides 157, 158 are carriage blocks attached to injector 20 and include protrusions (not shown) that are similar to protrusions 145 of first guide 45. The protrusions of guides 157, 158 engage respective protrusions 115, 120 of rail 25 similar to the engagement of protrusions 145 with respective protrusions 115, 120. Unlike first guide 45, second guide 50 is not directly coupled to rail 25 and is indirectly coupled to rail 25 via the attachment of second guide 50 to injector 20 and the attachment of injector 20 to guides 157, 158. In the illustrated embodiments, second guide 50 is a trunnion 160 including a body 165 with two flanges 170, 175 defining a space 180 to partially receive rail 25 (see FIG. 6). Trunnion 160 is attached to injector 20 via bolts 182. Each flange 170, 175 is adjacent one of respective lateral sides 80, 85 of rail 25. Flange 170 includes a protrusion 185 extending away from space 180. Flange 175 includes a protrusion 190 extending away from space 180. In the illustrated embodiments, protrusions 185, 190 are pins. However, a person of ordinary skill in the art would appreciate that protrusions 185, 190 can be located at other suitable locations not on flanges 170, 175.

In the illustrated embodiments, bell crank 55 is rotateably coupled to first guide 45 at first location 60 via a pin joint 192 and to second guide 50 at second location 65 via a pin joint 195 (i.e., protrusion 156 is partially received in bell crank 55 at first location 60 and protrusion 185 is partially received in bell crank 55 at second location 65). In the illustrated embodiments, bell crank 75 is rotateably coupled to first guide 45 at fourth location 90 via a pin joint 197 and to second guide 50 at fifth location 95 via a pin joint 200 (i.e., protrusion 156 is partially received in bell crank 55 at fourth location 90 and protrusion 190 is partially received in bell crank 75 at fifth location 95).

Referring to FIG. 2, actuator 30 is coupled to bell crank 55 at third location 70 and to bell crank 75 at sixth location 100 (see FIG. 5). In illustrated embodiments, actuator 30 is a linear actuator and includes a motor 205. Injector 20 comprises a barrel 210 and a nozzle 215, which is in fluid communication with barrel 210, to inject a molten material (not shown) into mold 40 via inlet 35 (see FIG. 1). When actuator 30 applies a force in first direction A at third location 70 and sixth location 100, especially when nozzle 215 is urged against inlet 35 of mold 40, because the force is offset by a perpendicular distance C from line D-D (i.e., perpendicular distance between lines D-D and E-E), barrel 210 will tend to rotate in angular direction B about location 220. As described in the present application, actuator 30 and injector 20 are configured to convert the linear force provided by actuator 30 into a linear component to linearly translate injector 20 along rail 25 and when actuator 30 is directing the linear force in first direction A, part of that force is also converted to counter the tendency of barrel 210 to rotate nozzle 215 away from rail 25. Reducing the tendency of barrel 210 to rotate in angular direction B involves selecting a suitable ratio between distance B, the perpendicular distance between lines B-B and C-C, and distance A, the perpendicular distance between lines A-A and D-D, and the ratio between distance D, the perpendicular distance between lines F-F and B-B, and distance C, the perpendicular distance between lines E-E and D-D.

While various embodiments according to the present application have been described above, it should be understood that they have been presented by way of illustration and example only, and not limitation. It will be apparent to persons of relevant ordinary skill in the relevant art that various changes in form and detail can be made therein without departing from the scope of the present application. For example, in the illustrated embodiments, rail 25 is a separate member attached to frame 15 via bolts but a person of ordinary skills in the relevant art would appreciate that rail 25 and frame 15 can be implemented as a unitary member. It will also be understood that each feature of each embodiment discussed herein, may be used in combination with the features of any other embodiment. Thus, the breadth and scope of the present invention should not be limited by the above-described exemplary embodiments, but should be defined only in accordance with the appended claims and their equivalents.

What is claimed is:

1. An apparatus for injecting a molten material comprising:

an injector for injecting the molten material;
a frame supporting the injector;
a rail for guiding the linear translation of the injector along the frame, the rail supported by the frame;
a first guide and a second guide slideably coupled to the rail, the second guide attached to the injector and spaced from the first guide along the rail; and
a bell crank including a first location, a second location, and a third location arranged in a triangle, the bell crank rotateably coupled to the first guide at the first location, the bell crank rotateably coupled to the second guide at the second location such that applying a linear force at the third location in a first direction from the second guide towards the first guide translates the first and second guides in the first direction along the rail.

2. The apparatus according to claim 1, wherein the rail includes two lateral opposite sides and the apparatus further comprising an another bell crank, each of the bell crank and the another bell crank is located on a respective one of the two lateral opposite sides of the rail; the another bell crank including a fourth location, a fifth location, and a sixth location arranged in a triangle, the another bell crank rotateably coupled to the first guide at the fourth location, the another bell crank rotateably coupled to the second guide at the fifth location such that applying a linear force at the sixth location in the first direction translates the first and second guides in the first direction along the rail.

3. The apparatus according to claim 2, wherein at any location along the rail, the first guide is substantially restricted from distancing from the rail in a second direction along a line not substantially parallel to the rail.

4. The apparatus according to claim 3, wherein the rail includes two longitudinal protrusions, one on each respective lateral sides of the rail, the first guide includes a body having two flanges defining a space for partially receiving the rail, each flange adjacent a respective lateral sides of the rail, each flange including a protrusion engaging a respective one of longitudinal protrusions of the rail thereby substantially restricting the first guide from distancing from the rail in the second direction.

5. The apparatus according to claim 4, wherein the bell crank is rotateably coupled to the first guide at the first location via a pin joint and the another bell crank is rotateably coupled to the first guide at the fourth location via a pin joint.

6. The apparatus according to claim 5, wherein the bell crank is rotateably coupled to the second guide at the second location via a pin joint and the another bell crank is rotateably coupled to the second guide at the fifth location via a pin joint.

7. The apparatus according to claim 6, wherein the rail is a linear slide rail.

8. The apparatus according to claim 7, wherein the first guide includes a carriage block.

9. The apparatus of claim 8, wherein the second guide is a trunnion including two pins one on each opposing sides of the trunnion extending away from the rail.

10. The apparatus of claim 9 further comprising a linear actuator rotateably coupled to the bell crank at the third location via a pin joint and rotateably coupled to the another bell crank at the sixth location via pin joint to translate the injector along the rail.

11. The apparatus of claim 10, wherein the linear actuator includes a motor.

12. The apparatus of claim 4 further comprising a third guide slideably coupled to the rail, upstream of the second guide, supporting and attached to the injector.

13. The apparatus of claim 12, wherein the bell crank is rotateably coupled to the first guide at the first location via a pin joint and the another bell crank is rotateably coupled to the first guide at the fourth location via a pin joint.

14. The apparatus of claim 13, wherein the bell crank is rotateably coupled to the second guide at the second location via a pin joint and the another bell crank is rotateably coupled to the second guide at the fifth location via a pin joint.

15. The apparatus of claim 14, wherein the rail is a linear slide rail.

16. The apparatus of claim 15, wherein the first guide includes a carriage block.

17. The apparatus of claim 16, wherein the second guide is a trunnion including two pins one on each opposing sides of the trunnion extending away from the rail.

18. The apparatus of claim 17 further comprising a linear actuator rotateably coupled to the bell crank at the third location via a pin joint and rotateably coupled to the another bell crank at the sixth location via pin joint to translate the injector along the rail.

19. The apparatus of claim 18, wherein the linear actuator includes a motor.

* * * * *